(12) United States Patent
Song

(10) Patent No.: US 12,542,325 B2
(45) Date of Patent: Feb. 3, 2026

(54) DETACHABLE BATTERY STRUCTURE OF FUSELAGE

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 312 days.

(21) Appl. No.: 18/375,137

(22) Filed: Sep. 29, 2023

(65) Prior Publication Data
US 2024/0339711 A1 Oct. 10, 2024

(30) Foreign Application Priority Data
Apr. 7, 2023 (KR) ........................ 10-2023-0046191

(51) Int. Cl.
*H01M 50/249* (2021.01)
*B64C 1/06* (2006.01)
*B64D 1/02* (2006.01)

(52) U.S. Cl.
CPC ........... *H01M 50/249* (2021.01); *B64C 1/062* (2013.01); *B64C 1/069* (2013.01); *B64D 1/02* (2013.01); *H01M 2220/20* (2013.01)

(58) Field of Classification Search
CPC .. H01M 50/249; H01M 50/579; H01M 50/20; B64C 1/062; B64C 1/069; B64C 1/068; B64C 1/16; B64C 1/061; B64C 1/06; B64D 1/02; B64D 1/00; B64D 41/00
See application file for complete search history.

(56) References Cited

U.S. PATENT DOCUMENTS

| | | | |
|---|---|---|---|
| 8,602,146 B2 | 12/2013 | Meyers et al. | |
| 8,967,529 B1 * | 3/2015 | Bennett | B60L 50/64 |
| | | | 446/57 |
| 9,617,013 B2 * | 4/2017 | Mairou | B64C 27/04 |
| 11,091,017 B2 * | 8/2021 | Shin | H01M 50/262 |
| 11,217,839 B2 * | 1/2022 | Zimmermann | H01M 10/625 |
| 11,316,224 B2 * | 4/2022 | Zimmermann | B60L 50/66 |

(Continued)

FOREIGN PATENT DOCUMENTS

| | | |
|---|---|---|
| JP | 2018-165137 A | 10/2018 |
| JP | 2018-165138 A | 10/2018 |

(Continued)

*Primary Examiner* — James M Dolak
(74) *Attorney, Agent, or Firm* — Banner & Witcoff, Ltd.

(57) ABSTRACT

A detachable battery structure of a fuselage including a floor unit positioned on a fuselage, a battery unit fastened to the floor unit and configured to receive a load in the event of a frontal collision of the fuselage, a battery unit extension fastened to a window frame of the fuselage and configured to transmit the load to the battery unit in the event of the frontal collision of the fuselage, a crash unit positioned in front of the window frame, and a dash reinforcement assembly fastened to the window frame and positioned on a rear surface of the crash unit, wherein the dash reinforcement assembly moves backward in the event of the frontal collision of the fuselage so that the battery unit extension moves in a longitudinal direction, and the battery unit is configured to move backward to be detached from the floor unit.

14 Claims, 18 Drawing Sheets

(56) References Cited

U.S. PATENT DOCUMENTS

| | | | | |
|---|---|---|---|---|
| 11,691,709 | B1* | 7/2023 | Donovan | B60L 50/66 |
| | | | | 188/377 |
| 11,787,554 | B2* | 10/2023 | Regnier | B64C 3/34 |
| | | | | 244/135 R |
| 11,993,360 | B2* | 5/2024 | Groninga | B64C 1/062 |
| 12,046,766 | B2* | 7/2024 | Hashimoto | B60K 1/04 |
| 12,057,562 | B2* | 8/2024 | Sweet | H01M 10/6569 |
| 12,116,131 | B2* | 10/2024 | Dalton | H01M 50/502 |
| 12,136,720 | B2* | 11/2024 | Amante | B64D 27/34 |
| 12,172,744 | B2* | 12/2024 | Song | B64D 41/00 |
| 12,199,305 | B2* | 1/2025 | Villanueva | H01M 10/625 |
| 12,255,343 | B2* | 3/2025 | Donovan | H01M 50/242 |
| 12,269,573 | B2* | 4/2025 | Song | B64C 25/52 |
| 12,337,947 | B2* | 6/2025 | Song | B64C 1/062 |
| 12,351,292 | B2* | 7/2025 | Song | B64C 3/187 |
| 12,388,144 | B2* | 8/2025 | Song | H01M 50/264 |
| 12,404,027 | B2* | 9/2025 | Song | B64D 11/0619 |
| 2021/0320366 | A1 | 10/2021 | Hashimoto | |

FOREIGN PATENT DOCUMENTS

| | | |
|---|---|---|
| JP | 2019-167060 A | 10/2019 |
| JP | 2022-053673 A | 4/2022 |
| KR | 10-2021-0058500 A | 5/2021 |

* cited by examiner

[ A-A CROSS SECTION ]

[ C-C CROSS SECTION ]

[ D-D CROSS SECTION ]

[ A-A CROSS SECTION ]

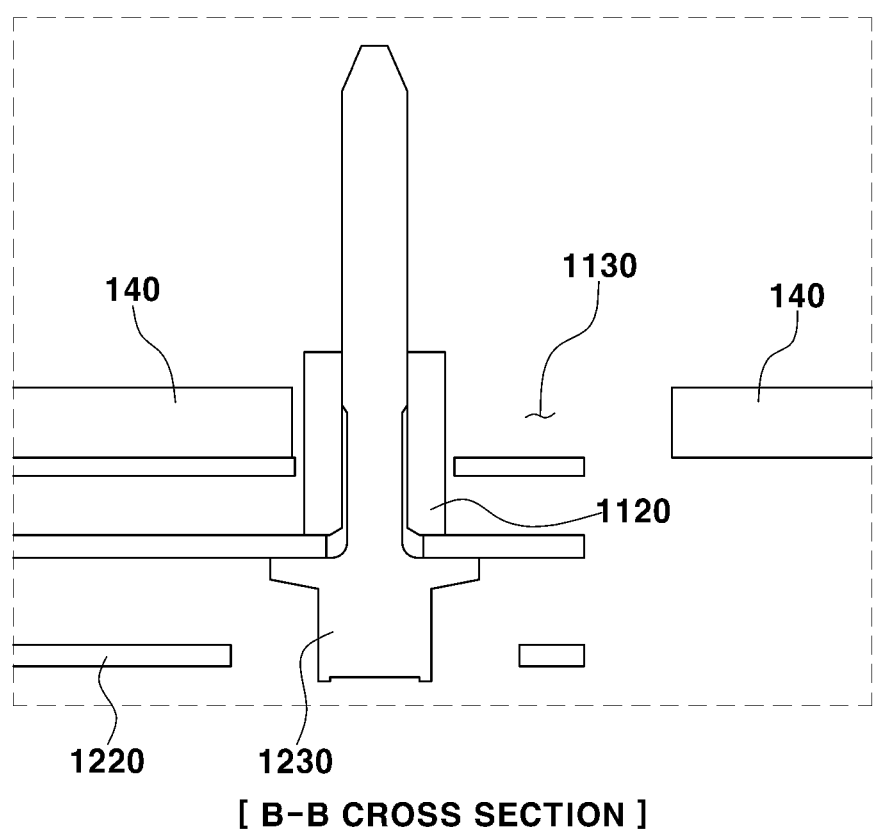

DETACHABLE BATTERY STRUCTURE OF FUSELAGE

CROSS-REFERENCE TO RELATED APPLICATION

This application claims the benefit of priority under 35 U.S.C. § 119 (a) to Korean Patent Application No. 10-2023-0046191, filed on Apr. 7, 2023, the entire contents of which are incorporated herein by reference.

TECHNICAL FIELD

The present disclosure relates to a detachable battery structure of a fuselage. In particular, the to a detachable battery structure of a fuselage may detach a battery from a fuselage based on a frontal collision of the fuselage (e.g., due to a crash of the fuselage), thereby securing fire stability.

BACKGROUND

Urban air mobility (UAM) may be used in an air traffic system. Such an air traffic system may solve traffic congestion on roads, for example. UAM may provide a transportation means capable of safely transporting occupants and/or cargo to a designated place without the need for a separate runway, since UAM vehicles are capable of a vertical take-off and/or landing. A UAM vehicle may also be used at a lower cost than helicopter because it may enable autonomous traveling.

Batteries, such as rechargeable or non-rechargeable lithium type batteries (e.g., lithium batteries and lithium ion batteries), are limitedly used in an aerospace field. The lithium type batteries may also be used in urban air mobility vehicles. However, these batteries use flammable electrolytes. In the event of an internal failure or an external impact, a temperature and/or a pressure may increase, which is also called thermal runaway. As a result, a battery case may be damaged and flammable electrolyte and/or flammable fluid or gas of the lithium type battery may be discharged. High temperature and/or flame may be emitted from the battery.

Conventional urban air mobility vehicles have a problem that safety is not ensured due to explosion of a battery positioned under occupants or fire due to an impact applied to the battery fixed to a fuselage in the event of a collision.

SUMMARY

The following summary presents a simplified summary of certain features. The summary is not an extensive overview and is not intended to identify key or critical elements.

Systems, apparatuses, and methods are described for a detachable battery structure. A detachable battery structure of a fuselage may comprise a floor connector connected to an inner surface of the fuselage; a battery unit comprising a battery frame configured to accommodate a battery fastened to the floor connector and configured to receive a load based on a frontal collision of the fuselage; a battery unit extension fastened to a window frame of the fuselage and configured to transmit the load from the window frame to the battery unit based on the frontal collision of the fuselage; a crash unit, comprising a crash box, positioned in front of the window frame; and a dash reinforcement assembly fastened to the window frame and positioned on a rear surface of the crash unit. The dash reinforcement assembly may be configured to move rearward, in a longitudinal direction of the fuselage, in response to a frontal collision of the fuselage, wherein the longitudinal direction is parallel to a direction from a front of the fuselage to a rear of the fuselage. The battery unit extension may be configured to move rearward in the longitudinal direction.

A detachable battery structure of a fuselage may comprise a floor connector connected to a skin of the fuselage; a battery unit, comprising a battery frame configured to accommodate a battery, fastened to the floor connector and configured to receive a load based on a frontal collision of the fuselage; a battery unit extension fastened to a window frame of the fuselage and configured to transmit the load from the window frame to the battery unit based on the frontal collision of the fuselage; a crash unit, comprising a crash box, positioned on a front end of the window frame; a dash reinforcement assembly fastened to the window frame and positioned on a rear surface of the crash unit; and a cross member positioned to a rear of the window frame and configured to allow the battery unit extension to pass therethrough. The battery unit extension may be configured to move rearward in a longitudinal direction of the fuselage in response to deformation of a space between the dash reinforcement assembly and the cross member based on the frontal collision of the fuselage, wherein the longitudinal direction is parallel to a direction from a front of the fuselage to a rear of the fuselage. The battery unit may be configured to be detached from the floor connector based on the rearward movement of the battery unit extension.

These and other features and advantages are described in greater detail below.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein:

FIG. 13C is a cross-sectional view along B-B in FIG. 13A according to an example of the present disclosure.

Figure 1:
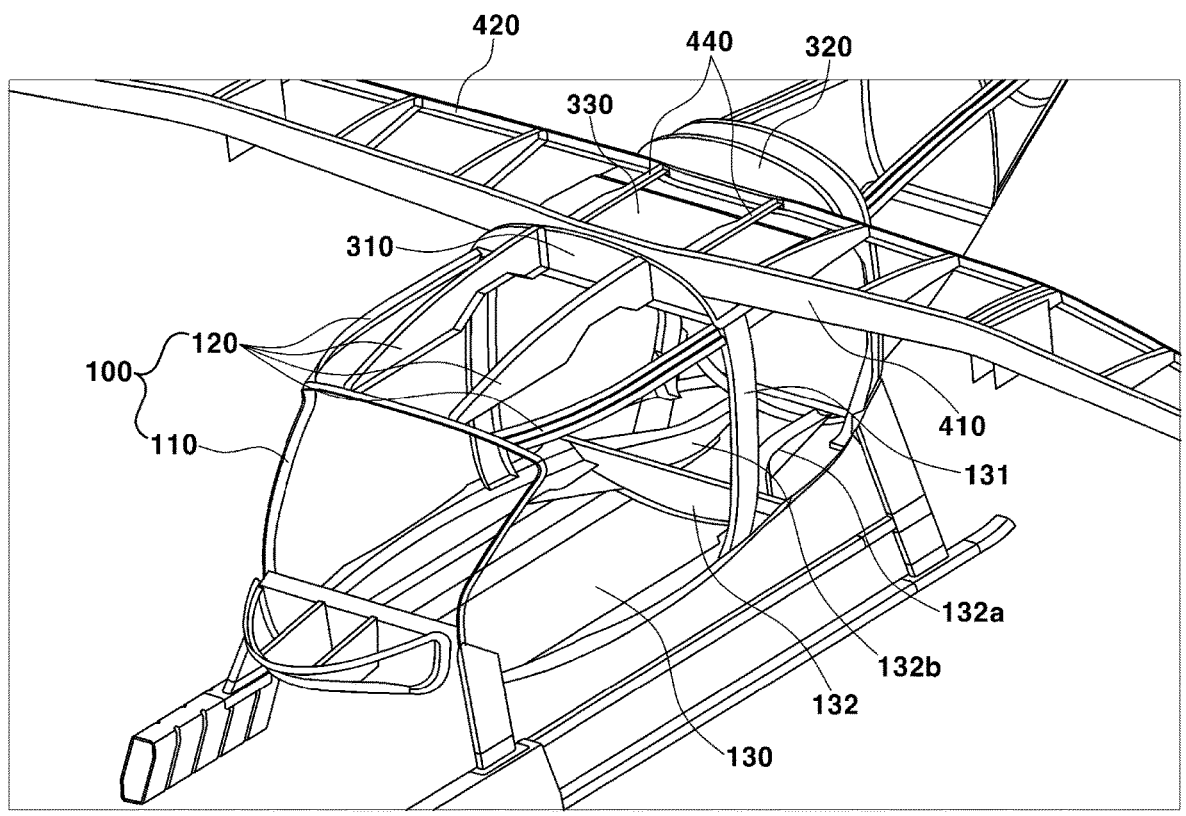
FIG. 1 is a perspective view illustrating a load distribution structure of a fuselage according to an example of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, examples of the present disclosure will be described in more detail with reference to the accompanying drawings. The examples of the present disclosure may be modified in various forms, and the scope of the present disclosure should not be construed as being limited to the following examples. The examples are provided to more completely describe the present disclosure to those skilled in the art.

In addition, terms such as "part," "unit," and "member" described in the specification mean a unit that processes at least one function or operation, which may be implemented as software or hardware.

In addition, when a certain portion described in the specification is described as being "connected" to another, this includes not only a case in which the certain portion is directly connected thereto but also a case in which the certain portion is indirectly connected thereto, and the indirect connection includes connection via a wireless communication network.

In addition, "upper end" described in the specification means a direction moving to an upper end in a height direction on the drawing, and "lower end" means a direction moving to a lower end in the height direction on the drawing.

In addition, when a certain portion is described as being "on" or "above" another in the specification, this includes not only a case in which the certain portion is "directly on" another, but also a case in which other portions are present therebetween. In addition, when a certain portion is described as being "below" or "under" another in the specification, this includes not only a case in which the certain portion is "directly below" another, but also a case in which other portions are present therebetween.

In addition, in the specification, "height direction," "width direction," and "longitudinal direction" are defined with reference to a fuselage of a vehicle.

It is understood that the term "vehicle" or "automobile or other similar term as used herein is inclusive of motor vehicle in general, such as passenger automobiles including sports utility vehicles (operation SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example gasoline power and electric power.

In addition, "fuselage" described in the specification may be of an urban air mobility (UAM) vehicle. A situation in which a frontal collision occurs if the UAM vehicle crashes has been described as an example.

Figure 2:
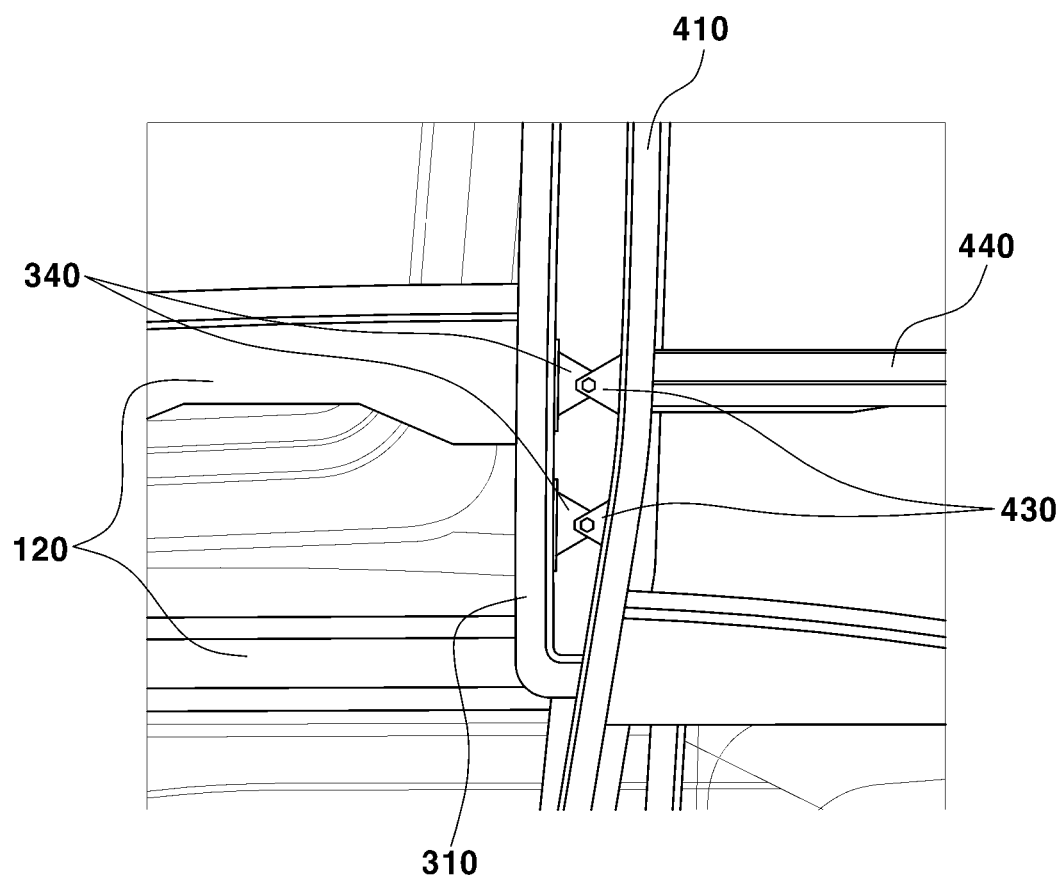
FIG. 2 is a side perspective view illustrating the load distribution structure of the fuselage according to an example of the present disclosure and illustrates a fastening relationship between a support fitting member and a wing fitting member.

FIG. 1 is a perspective view illustrating a load distribution structure of a fuselage according to an example of the present disclosure, and FIG. 2 is a side perspective view illustrating the load distribution structure of the fuselage according to an example of the present disclosure and illustrates a fastening relationship between a support fitting member and a wing fitting member.

Referring to FIGS. 1 and 2, the collision load distribution structure of the fuselage according to an example of the present disclosure may include a support unit 300 connected to a wing unit 400 between a front unit 100 and a rear unit 200 and may be configured to distribute a load applied to a fuselage to the wing unit 400 and a rear of the fuselage. According to an example of the present disclosure, the collision load distribution structure of the fuselage may be configured so that a load in a longitudinal direction and a load in a height direction entering the fuselage are transmitted via a connection structure of the front unit 100 and the support unit 300, a connection structure of the support unit 300 and the rear unit 200, and a connection structure of the support unit 300 and the wing unit 400 to reduce the collision load entering a space in which occupants are positioned.

The front unit 100 may be positioned at a front end with respect to a wing of the fuselage. The front unit 100 may include a window frame 110 and a roof frame 120 on which a windshield glass is mounted. The roof frame 120 may be connected to a rear end of the window frame 110 and may extend in the longitudinal direction of the fuselage. The window frame 110 may be a frame surrounding a front windshield glass of the fuselage. The roof frame 120 may be configured to be fastened to an upper end of the window frame 110, and a plurality of roof frames 120 may be spaced apart from each other in the width direction of the window frame 110. In an example, as illustrated in FIG. 1, two roof frames 120 may be formed at the center and two roof frames 120 may be formed at sides in a width direction of the window frame 110, and the four roof frames 120 may be configured to have the same interval. The floor frame 130 may constitute a floor of the fuselage and may separate an inner space inside the front unit 100 and to be divided into a first row passenger space at the front side and a second row passenger space at the rear side. In an example, the floor frame 130 may be divided into the first row passenger space and the second row passenger space with a rear bulkhead 132 as a boundary, and the rear bulkhead 132 may include a pair of connection frames 132a and 132b to be connected to a second rear frame 220 to be described below.

The support unit 300 may be positioned between the front unit 100 and the rear unit 200. The roof frame 120 may be configured to be connected to the support unit 300. A rear end of the roof frame 120 may be configured to be connected to a front end of the support unit 300. The support unit 300 may be configured to be connected to the front unit 100 and the rear unit 200 to distribute a load applied to the front of the fuselage rearward. The support unit 300 may be configured to include a first flange part 310, a second flange part 320, a plate part 330, and a support fitting member 340.

The support unit 300 may be configured so that the first flange part 310 and the second flange part 320 face each other with respect to the plate part 330. A space in which the first flange part 310 and the second flange part 320 face each other and are fastened may be included inside the support unit 300. The first flange part 310 may be connected to the rear end of the roof frame 120. The rear end of the roof frame 120 may be fastened to a front outer surface of the first flange part 310. The second flange part 320 may be connected to a front end of the rear unit 200. The front end of the rear unit 200 may be fastened to a rear outer surface of the second flange part 320.

The plate part 330 may be formed between the first flange part 310 and the second flange part 320. The plate part 330 may constitute a rear surface of a recessed region between the first flange part 310 and the second flange part 320 positioned on both side surfaces in a longitudinal direction. The plate part 330 may be formed in a plate shape and formed between lower ends of the first flange part 310 and the second flange part 320. The plate part 330 may be configured to be connected to a member forming an external skeleton of the fuselage to transmit loads in the longitudinal direction and height direction of the fuselage.

The support fitting member 340 may be formed on both inner surfaces of the first flange part 310 and the second flange part 320. In an example, two wing fitting members 340 may be formed on each of left and right outer side surfaces of the first flange part 310 in the width direction. In addition, two support fitting members 340 may be formed on each of left and right inner side surfaces of the second flange part 320. One end of the support fitting member 340 may be configured at a position corresponding to each of the inner sides of the first flange part 310 and the second flange part 320, and coupling parts may be formed on the other ends of the first flange part 310 and the second flange part 320 corresponding to both ends of the support fitting member 340 and fastened to the support fitting member 340.

The wing unit 400 may be positioned inside the support unit 300. The wing unit 400 may be configured to be connected to the support unit 300 to distribute loads along the wing unit 400 in the event of the collision of the fuselage.

The wing unit 400 (e.g., wing(s)) may comprise the first skeleton part 410, a second skeleton part 420, the wing fitting member 430, the wing frame part 440, and/or a skin part 450 (e.g., a skin). The first skeleton part 410 may be spaced at a predetermined interval from the inside of the first flange part 310 and formed to extend in the width direction of the fuselage. The second skeleton part 420 may be spaced at a predetermined interval from the inside of the second flange part 320 and formed to extend in the width direction of the fuselage. The first skeleton part 410 may constitute a transverse skeleton of the front end of the wing unit 400, and the second skeleton part 420 may constitute a transverse skeleton of the rear end of the wing unit 400.

The wing fitting member 430 may be formed at outer sides of the first skeleton part 410 and the second skeleton part 420 at positions corresponding to the support fitting member 340 in the longitudinal direction. Furthermore, the outer side of the first skeleton part 410 at which the wing fitting member 430 is positioned may mean a direction in which the first skeleton part 410 faces the first flange part 310, and the outer side of the second skeleton part 420 at which the wing fitting member 430 is positioned may mean a direction in which the second skeleton part 420 faces the second flange part 320.

The wing fitting member 430 may be configured to be connected to the support fitting member 340. In an example, two wing fitting members 430 may be formed on each of left and right outer side surfaces of the first skeleton part 410 in the width direction. In addition, two support fitting members 430 may be formed on each of left and right outer side surfaces of the second skeleton part 420 in the width direction. The wing fitting member 430 may have one end fixed to the outer sides of the first skeleton part 410 and the second skeleton part 420 and have a coupling part formed on the other end thereof. The coupling part of the support fitting member 340 and the coupling part of the wing fitting member 430 may be fastened, and the wing unit 400 may be fixed to the support unit 300.

The wing frame part 440 may be formed between the first skeleton part 410 and the second skeleton part 420. The wing fitting member 430 is configured at a position corresponding to one end of the wing frame part 440 in the longitudinal direction. As illustrated in FIG. 1, two wing frame parts 440 may be formed between the first skeleton part 410 and the second skeleton part 420 positioned above the plate part 330. Furthermore, the wing frame part 440 may be positioned between the first skeleton part 410 and the second skeleton part 420 and configured so that the loads applied to the first skeleton part 410 and the second skeleton part 420 are transmitted to each other.

The skin part 450 may be configured to surround the outer sides of the first skeleton part 410 and the second skeleton part 420. The skin part 450 may be positioned in contact with upper surfaces of the first skeleton part 410 and the second skeleton part 420. The skin part 450 positioned in contact with the first skeleton part 410 and the second skeleton part 420 may be configured so that the loads transmitted to the first skeleton part 410 and the second skeleton part 420 are distributed in the longitudinal direction or width direction of the wing unit 400. The load of the fuselage in the longitudinal direction may be configured to be distributed to the wing unit 400 via the support unit 300 after passing the front unit 100.

Figure 3:
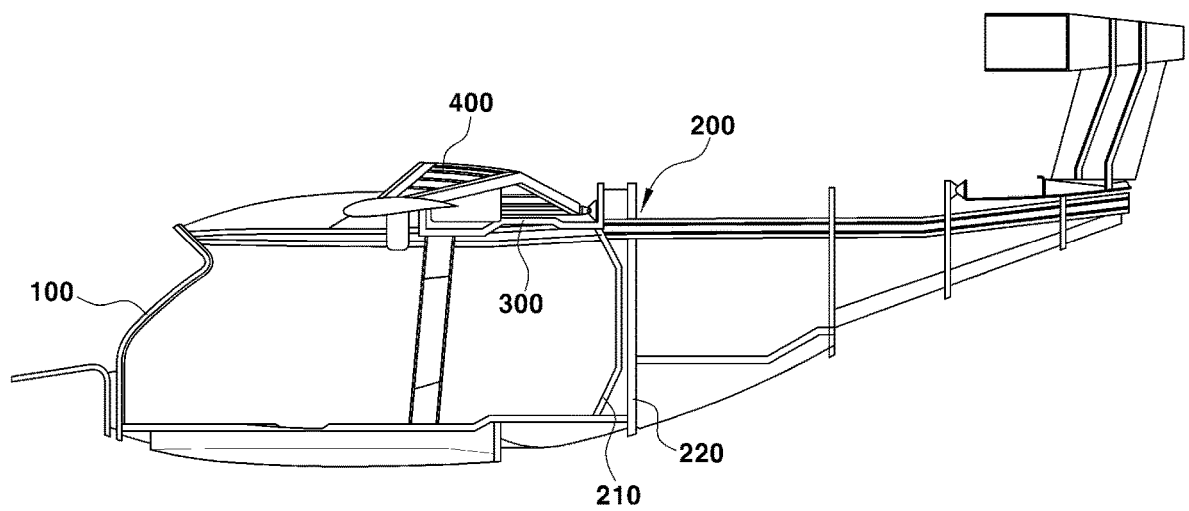
FIG. 3 is a view illustrating a rear unit of the load distribution structure of the fuselage according to an example of the present disclosure.
Figure 4:
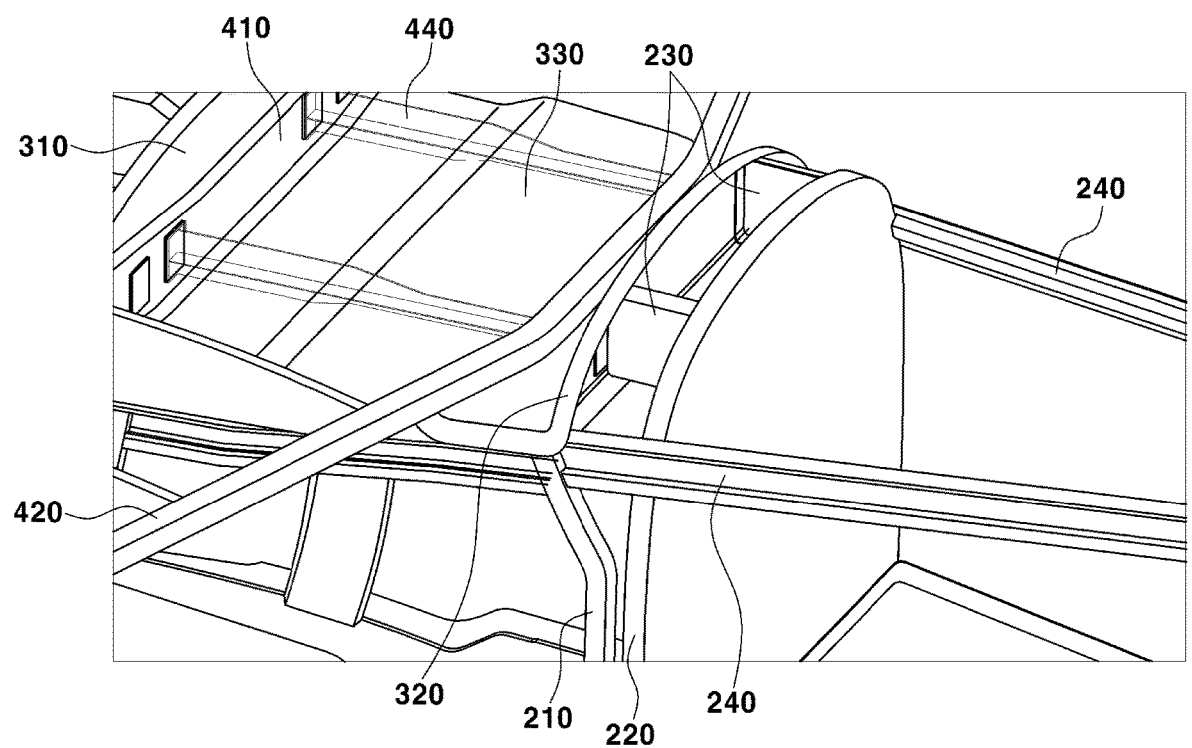
FIG. 4 is a view illustrating a connection relationship between a wing unit and the rear unit of the load distribution structure of the fuselage according to an example of the present disclosure.

FIG. 3 is a view illustrating a rear unit of the collision load distribution structure of the fuselage according to an example of the present disclosure, and FIG. 4 is a view illustrating a connection relationship between the wing unit 400 and the rear unit of the collision load distribution structure of the fuselage according to an example of the present disclosure.

Referring to FIGS. 3 and 4, the rear unit 200 may be positioned at a rear end with respect to the wing of the fuselage. The rear unit 200 may include a first rear frame 210, the second rear frame 220, a rear center frame 230, and a rear side frame 240. The first rear frame 210 may be configured to be connected to the plate part 330. The first rear frame 210 may extend in the height direction along the outer side of the fuselage and may be fastened to a lower end of the second flange part 320 from the floor of the fuselage. In an example, an upper end of the first rear frame 210 may be positioned in contact with the other end of the second flange part 320.

The second rear frame 220 may be located on a rear end of the first rear frame 210. The second rear frame 220 may be formed in a plate shape adjacent to the rear end of the first rear frame 210. Since the second rear frame 220 may be positioned to have a predetermined interval (e.g., an interval corresponding to a length of the rear center frame 230 in FIG. 4 with respect to the upper end of the first rear frame 210), the second rear frame 220 may be configured to transmit the load coming from the lower end of the fuselage to the upper end of the fuselage in the height direction.

The rear center frame 230 may be positioned between the second flange part 320 and the second rear frame 220. The rear center frame 230 may be positioned in the space in which the second flange part 320 and the second rear frame 220 face each other. In an example, two rear center frames 230 may be formed at positions corresponding to the positions of the wing frame parts 440 in the longitudinal direction.

The rear side frame 240 may be positioned in contact with the first rear frame 210 and the second rear frame 220. The rear side frame 240 may be connected to the upper end of the first rear frame 210 and the upper end of the second rear frame 220. The rear side frame 240 may extend rearward in the longitudinal direction of the fuselage (e.g., toward a rear end of the fuselage). One end of the rear side frame 240 may be connected to the first rear frame and the other end thereof may extend to the rear of the fuselage.

Figure 5:
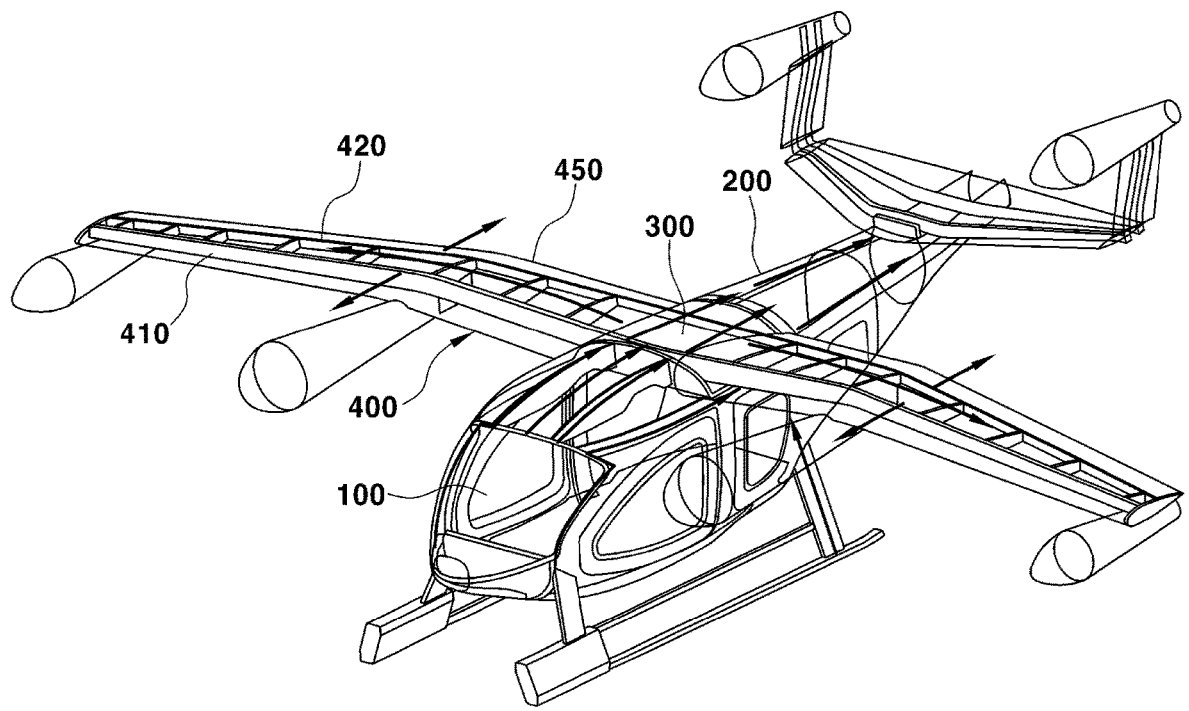
FIG. 5 is a view illustrating that a load in a longitudinal direction and a load in a height direction of the load distribution structure of the fuselage according to an example of the present disclosure are distributed to the wing unit and a rear of the fuselage.

FIG. 5 is a view illustrating that a load in a longitudinal direction and a load in a height direction in the collision load distribution structure of the fuselage according to an example of the present disclosure are distributed to the wing unit 400 and the rear of the fuselage.

Referring to FIG. 5, the load of the fuselage in the longitudinal direction may be transmitted to the first flange part 310 via the window frame 110 and the roof frame 120 and then transmitted to the first skeleton part 410 after passing the support fitting member 340 and the wing fitting member 430 and distributed via the skin part 450. In addition, the load transmitted to the first skeleton part 410 may be transmitted to the second skeleton part 420 via the wing frame part 440 and distributed via the skin part 450.

In an example, if the fuselage crashes and a collision load is applied to have a predetermined angle with the front end of the fuselage, the load in the longitudinal direction may enter the window frame 110 and may be transmitted to the front end of the roof frame 120 connected to the rear end of the window frame 110. Then, the load transmitted to the rear end of the roof frame 120 may be transmitted to the first flange part 310 and subsequently transferred to the support fitting member 340 and the wing fitting member 430. The loads transmitted to the support fitting member 340 and the wing fitting member 430 may be transmitted to the first skeleton part 410 and distributed in the longitudinal direction of the first skeleton part 410. The load distributed in the longitudinal direction of the first skeleton part 410 may also be distributed in the longitudinal direction of the fuselage via the skin part 450. In addition, the load transmitted to the first skeleton part 410 may be transmitted to the second skeleton part 420 via the wing frame part 440 and distributed in the longitudinal direction of the second skeleton part 420. The load distributed in the longitudinal direction of the second skeleton part 420 may also be distributed in the longitudinal direction of the fuselage via the skin part 450.

Meanwhile, the load of the fuselage in the height direction may be configured to be transmitted to the second flange part 320 via the first rear frame 210, transmitted to the rear side frame 240 and the rear center frame 230 of the rear unit 200 via the second rear frame 220, subsequently transmitted to the second skeleton part 420 after passing the support fitting member 340 and the wing fitting member 430, and distributed via the skin part 450. In addition, the load transmitted to the second skeleton part 420 may be configured to be transmitted to the first skeleton part 410 via the wing frame part 440 and distributed via the entire region of the fuselage.

In an example, if a collision load of the fuselage in the height direction is applied, the load in the height direction transmitted to the fuselage may enter the lower end of the first rear frame 210 and may be transmitted to the second flange part 320 connected to the upper end of the first rear frame 210. In addition, a part of the load in the height direction applied to the fuselage may enter the lower end of the second rear frame 220 and may be transmitted to the rear side frame 240 connected to the upper end of the second rear frame 220. The collision load applied to the second rear frame 220 may be transmitted to the second flange part 320 and transmitted to the wing fitting member 430 via the support fitting member 340 fastened to the second flange part 320. The loads transmitted to the support fitting member 340 and the wing fitting member 430 may be transmitted to the second skeleton part 420 and distributed in the longitudinal direction of the second skeleton part 420. The load distributed in the longitudinal direction of the second skeleton part 420 may also be distributed in the longitudinal direction of the fuselage via the skin part 450. In addition, the load transmitted to the second skeleton part 420 may be transmitted to the first skeleton part 410 via the wing frame part 440 and distributed in the longitudinal direction of the first skeleton part 410. The load distributed in the longitudinal direction of the first skeleton part 410 may also be distributed in the longitudinal direction of the fuselage via the skin part 450. Therefore, the load of the fuselage in the height direction may be configured to be distributed to the wing unit 400 via the support unit 300 from the rear unit 200.

Figure 6:
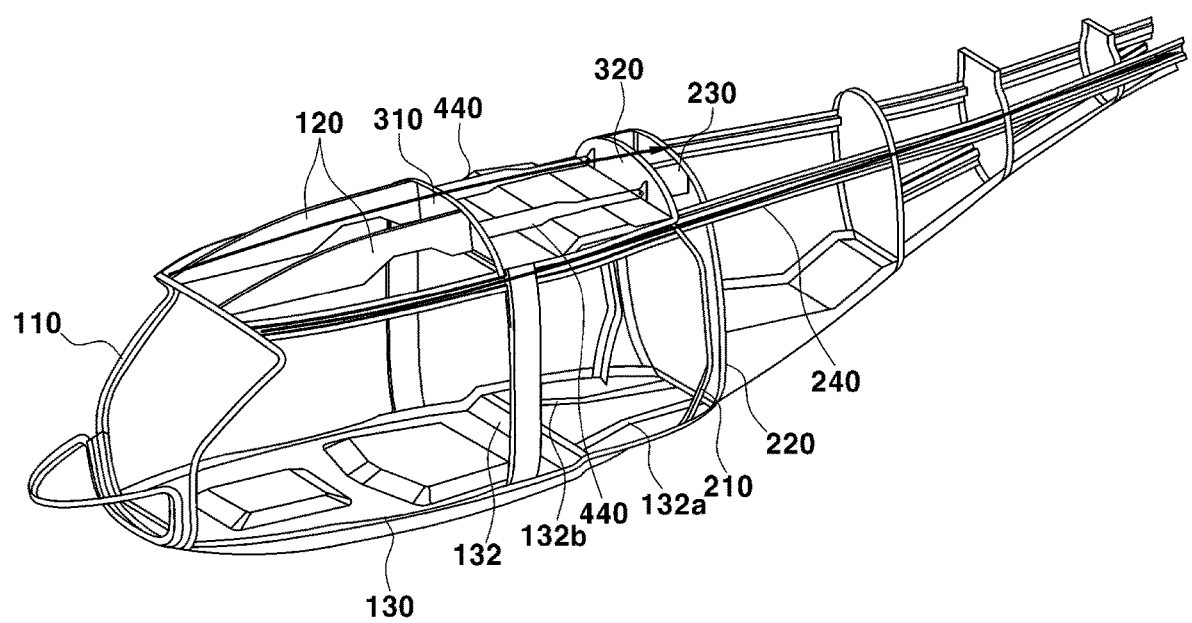
FIG. 6 is a view illustrating transmission of a center load and a side load in the longitudinal direction in the load distribution structure of the fuselage according to an example of the present disclosure.

FIG. 6 is a view illustrating transmission of a center load and a side load in the longitudinal direction in the collision load distribution structure of the fuselage according to an example of the present disclosure.

Referring to FIG. 6, the load applied in the longitudinal direction of the fuselage may be transmitted from the roof frame 120 to the wing frame part 440 via the first flange part 310 and transmitted from the wing frame part 440 to the rear center frame 230 via the second flange part 320. In addition, side loads of the fuselage in the longitudinal direction may be transmitted from both ends of the front side of the roof frame 120 to the rear side frame 240 after passing the first rear frame 210 along the side surface of the plate part 330.

The load applied in the longitudinal direction of the fuselage may be transmitted from the front end to the rear end of the roof frame 120 and transmitted to the support fitting member 340 and the wing fitting member 430 adjacent to the first flange part 310 via the first flange part 310. Subsequently, the loads transmitted to the support fitting member 340 and the wing fitting member 430 adjacent to the first flange part 310 may be transmitted to the wing frame part 440 and re-transmitted to the support fitting member 340 and the wing fitting member 430 adjacent to the second flange part 320. The loads transmitted to the support fitting member 340 and the wing fitting member 430 adjacent to the second flange part 320 may be transmitted to the second flange part 320 and subsequently transmitted to the rear center frame 230.

In addition, the load transmitted to the side surface among the loads of the fuselage in the longitudinal direction may be transmitted from the front end to the rear end of the fuselage along both ends of the roof frame 120 and transmitted to a rear surface of the fuselage in the longitudinal direction of the plate part 330. The load transmitted to a rear end of the plate part 330 may be transmitted to the rear side frame 240 after passing the first rear frame 210.

In summary, the present disclosure provides the collision load distribution structure, which may transmit and distribute the collision load entering the fuselage to the wing unit 400 and the rear of the fuselage by applying the support unit 300 to reduce the collision load entering the space in which the passenger is positioned, thereby securing stability.

Figure 7:
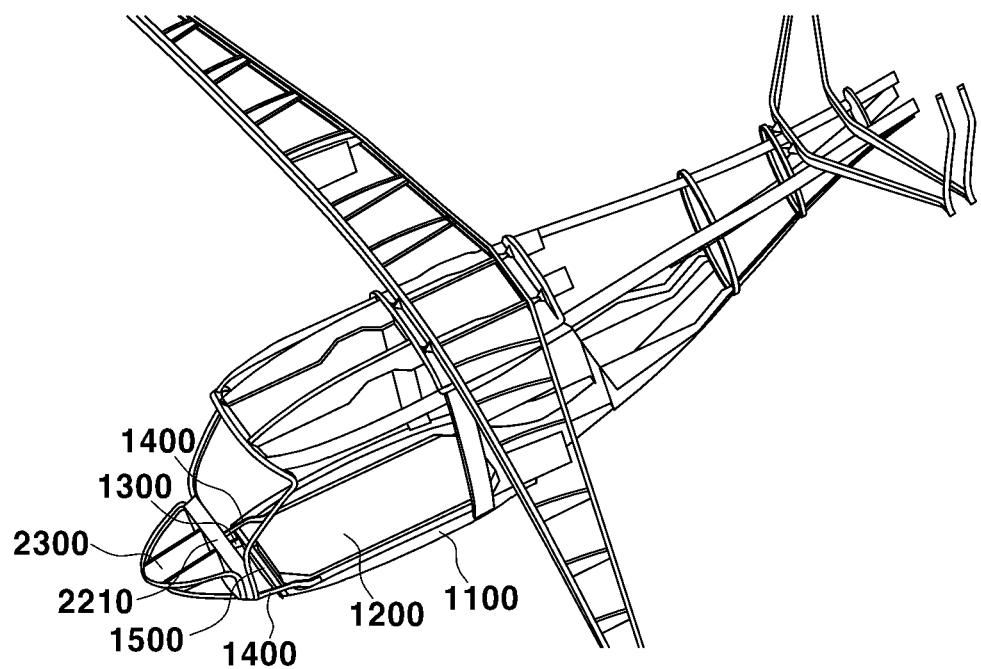
FIG. 7 is a perspective view illustrating a detachable battery structure of the fuselage according to an example of the present disclosure.
Figure 8A:
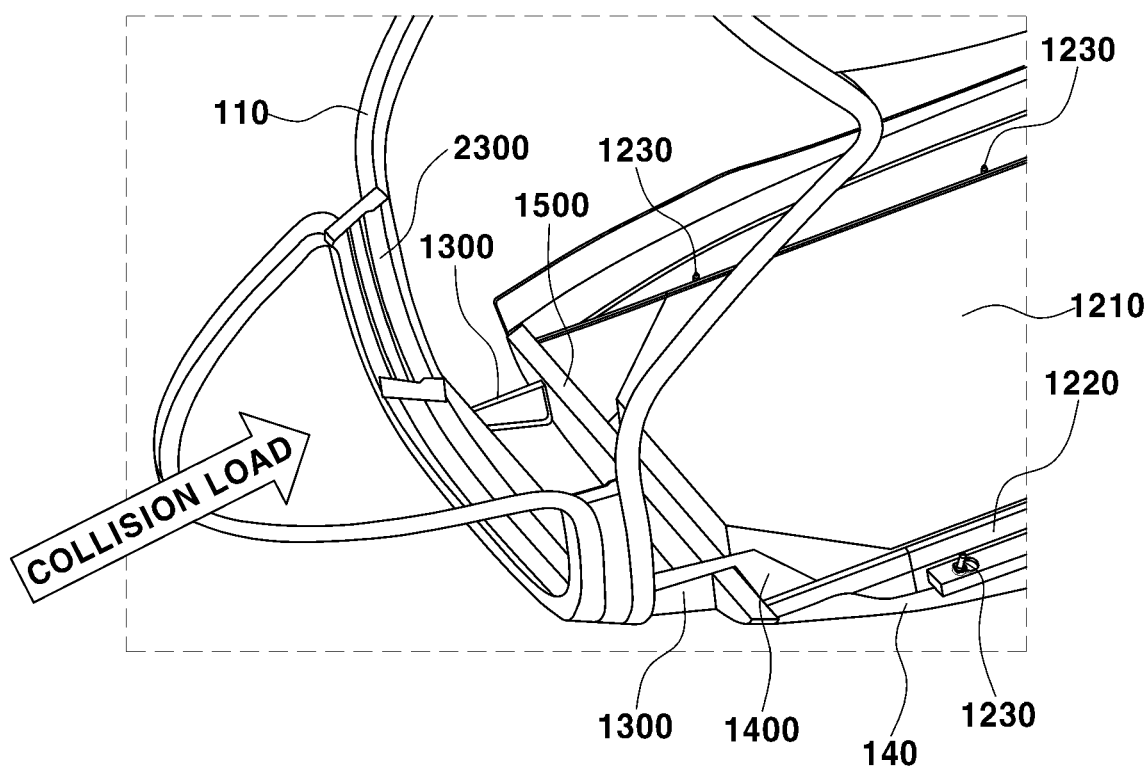
FIG. 8A is a configuration diagram of the detachable battery structure of the fuselage according to an example of the present disclosure and a view illustrating a collision load application direction thereof.

FIG. 7 is a perspective view illustrating a detachable battery structure of the fuselage according to an example of the present disclosure, and FIG. 8A is a configuration diagram of the detachable battery structure of the fuselage according to an example of the present disclosure and a view illustrating a collision load application direction thereof.

Referring to FIGS. 7 and 8A, the detachable battery structure of the fuselage may be configured so that a battery unit 1200 is detachable from a floor unit 1100 of the fuselage (e.g., fixed to and/or part of a floor and/or bottom part of the fuselage) in the event of a frontal collision of the fuselage. The floor unit 1100 may be fixed to and/or part of a skin part 150 (e.g., a skin) of the fuselage (e.g., near a bottom of the fuselage, such as below the floor frame 110). The floor unit 1100 may be fixed to an inner surface of the skin of the fuselage and formed to extend in the longitudinal direction of the fuselage. In addition, or alternatively, the floor unit 1100 may extend inward in the width direction of the fuselage (e.g., the floor unit 1100 may extend from an inner side portion of the. The floor unit 1100 may be positioned under the floor panel of the fuselage and formed to extend inward toward the battery unit 1200 in the width direction of the fuselage.

The battery unit 1200 may be fastened to the floor unit 1100 and configured to receive a load in the event of the frontal collision of the fuselage. The battery unit 1200 may include and/or be configured to accommodate a battery 1210. The battery unit 1200 may comprise a battery frame 1220 and/or a fastening part 1230. The battery 1210 may be positioned under the floor panel 10 of the fuselage via the battery unit 1200. The battery 1210 and/or the battery unit may have a predetermined thickness and may extend in the longitudinal direction of the fuselage.

The battery frame 1220 may extend from a side surface of the battery 1210 in the longitudinal direction. The battery frame 1220 may comprise a vertical flange for fixing both ends of the battery 1210 in the width direction and a horizontal flange protruding outward from the vertical flange in parallel with the floor unit 1100.

A battery unit extension 1400 may be fastened to the window frame 110 of the fuselage. The battery unit extension 1400 may be fastened between one end surface of a lower portion of the window frame 110 and the battery frame 1220. The battery unit extension 1400 may have one end fastened to the window frame 110 and the other end fastened to the vertical flange of the battery frame 1220.

The battery unit extension 1400 may be configured to extend in the longitudinal direction to transmit a load to the battery unit 1200 in the event of the frontal collision of the fuselage. If a crash load is applied to the window frame 110, the window frame 110 moves backward, and the battery unit extension 1400 may be configured to move in the longitudinal direction in response thereto. The battery unit extension 1400 may be configured to transmit the load to the battery frame 1220 by moving in the longitudinal direction.

According to an example of the present disclosure, in the event of the frontal collision of the fuselage, the window frame 110 may be configured to move backward so that the battery unit extension 1400 moves in the longitudinal direction, and the battery unit 1200 may be configured to move backward to be detached from the floor unit 1100. An impact force is applied to the window frame 110 in the event of the frontal collision of the fuselage, and the window frame 110 moves rearward in the longitudinal direction. The battery unit extension 1400 may move backward in response to the longitudinal movement of the window frame 110, and the battery unit 1200 may be detached from the floor unit 1100 as the battery frame 1220 is pushed backward.

Meanwhile, in a detachable battery structure of a fuselage according to another example of the present disclosure, the battery unit 1200 may be configured to be detached from the floor unit 1100 in response to the deformation of a space between the window frame 110 and a cross member 1500 in the event of the frontal collision. The cross member 1500 may be positioned to the rear of the window frame 110 (e.g., adjacent to and to the rear of the window frame 110) and configured to pass through the battery unit extension 1400. The battery unit extension 1400 may be configured to pass through the cross member 1500 to move in the longitudinal direction. The cross member 1500 may be fixed to the fuselage and/or formed in the width direction and positioned adjacent to a front end of the battery unit 1200.

The deformation of the space between the window frame 110 and the cross member 1500 may mean a difference in the space between the window frame 110 and the cross member 1500 before the frontal collision of the fuselage and the space between the window frame 110 and the cross member 1500 after the collision. In the event of the frontal collision of the fuselage, the window frame 110 may move relatively more backward than the cross member 1500. The deformation of the space between the window frame 110 and the cross member 1500 may mean a relative movement distance between the window frame 110 and the cross member 1500. In addition, the deformation of the space between the window frame 110 and the cross member 1500 may be the movement distance of the battery unit extension 1400 in the longitudinal direction.

A front reinforcement member 1300 may be formed between the window frame 110 and the cross member 1500. The front reinforcement member 1300 may be configured to absorb a load in the event of the collision of the fuselage. In an example, two front reinforcement members 1300 may be formed at both ends of the fuselage to correspond to positions of the battery unit extension 1400 in the width direction. The front reinforcement member 1300 may be configured to increase the rigidity between the window frame 110 and the cross member 1500 without collision of the fuselage.

If an impact is applied to the front of the fuselage (e.g., via a collision), a dash reinforcement assembly 2300 may move backward, and the front reinforcement member 1300 moves backward to have a movement amount equal to or smaller than a movement amount of the dash reinforcement assembly 2300 in a state in which the dash reinforcement assembly 2300 has moved in a direction facing the cross member 1500. Therefore, the battery unit extension 1400 configured to correspond to the movement of the front reinforcement member 1300 is configured to be pushed backward from the fuselage.

The front reinforcement member 1300 may be configured to absorb a load to be deformed in the event of the frontal collision of the fuselage. In an example, in the event of a longitudinal collision, the crash unit 2200, the dash reinforcement assembly 2300, and the front reinforcement member 1300 may primarily absorb the load to move in the longitudinal direction, and the space between the window frame 110 and the cross member 1500 may be reduced in response to a difference value of the relative longitudinal movement distances of the floor unit 1100 and the battery unit 1200 by the moved front reinforcement member 1300. That is, if the space between the dash reinforcement assembly 2300 and the cross member 1500 is reduced, the battery unit extension 1400 moves backward in the longitudinal direction and moves backward with respect to the floor unit 1100.

The fastening part 1230 may be formed on and/or attached and/or fixed to the battery frame 1220. The fastening part 1230 may be a fastener configured to fix the battery unit 1200 to the floor unit 1100. The fastening part 1230 may be fixed to a member in contact with a lower surface of the floor unit 1100 of the battery frame 1220 and formed to extend in the longitudinal direction. The battery frame 1220 may be fixed to the floor unit 1100 via the fastening part 1230 and configured to fix the battery 1210 fixed to the battery frame 1220 to the fuselage. In an example, the fastening part 1230 may be formed of a bolt, inserted into a lower portion of the battery frame 1220, and bolt-fastened to the floor unit 1100. A plurality of fastening parts 1230 may be spaced apart from each other in the longitudinal direction of the battery frame 1220.

Figure 8B:
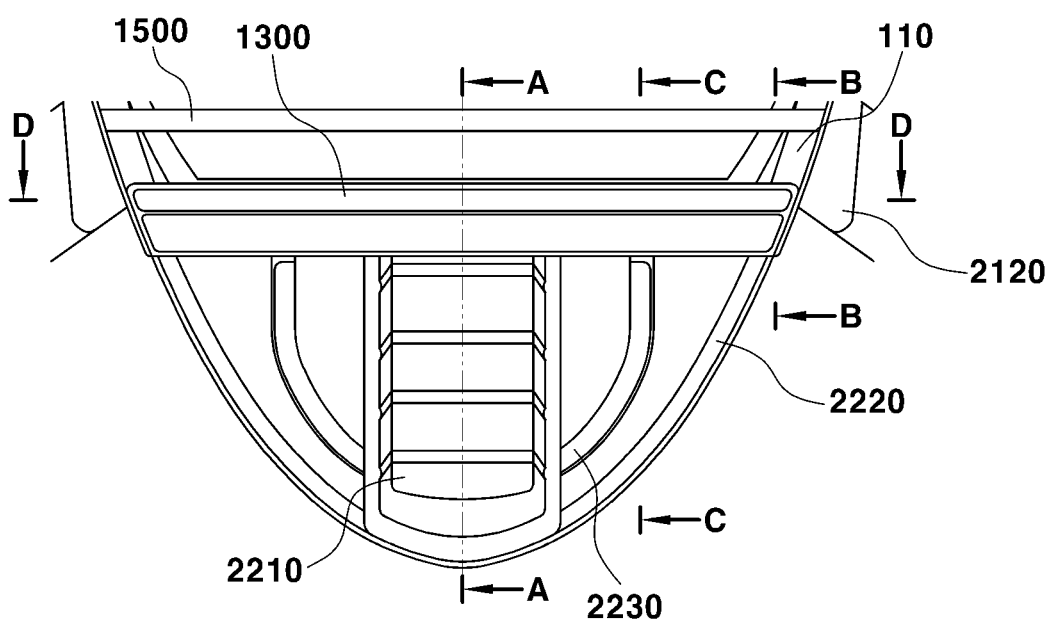
FIG. 8B is a top view of an urban air mobility vehicle including a crash unit according to an example of the present disclosure.
Figure 8C:
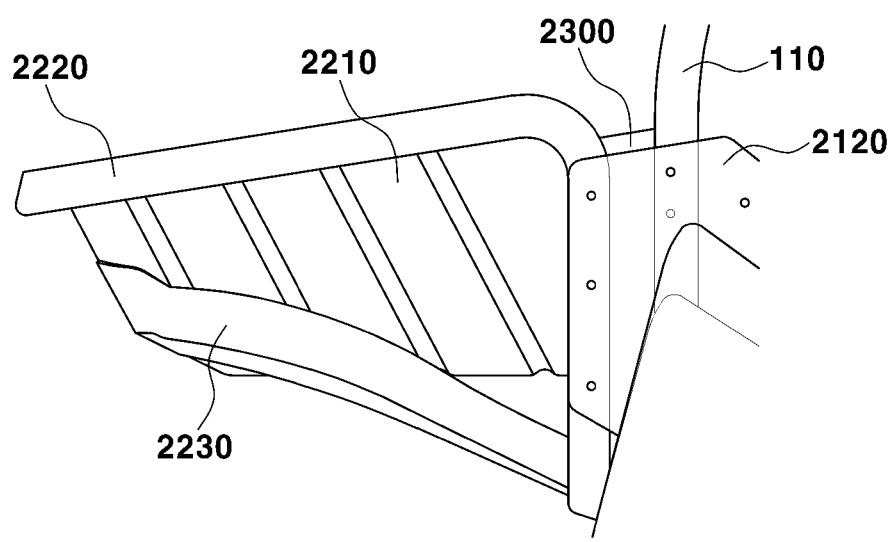
FIG. 8C is a side view illustrating the urban air mobility vehicle including the crash unit according to an example of the present disclosure.
Figure 8D:
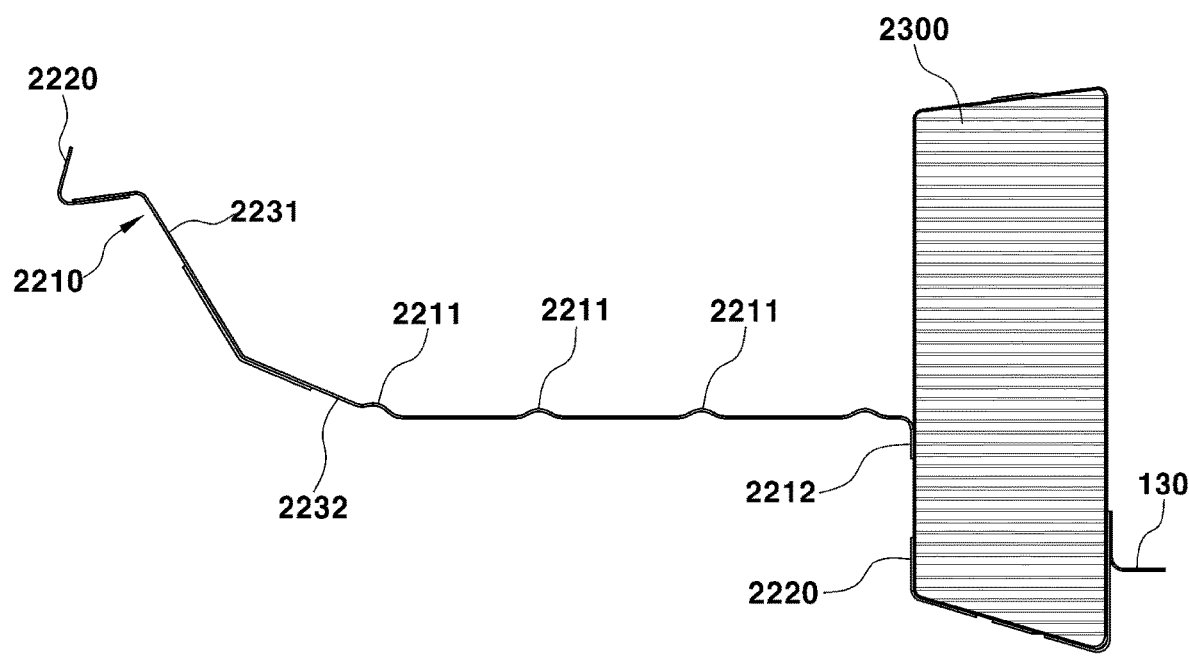
FIG. 8D is a cross-sectional view along line A-A of the crash unit according to an example of the present disclosure.

FIGS. 8B to 8D are enlarged views of the crash unit 2200 positioned to protrude from the front of the fuselage 10.

As disclosed in FIG. 8B, the crash unit 2200 is configured to have a streamlined cross-sectional shape protruding forward from the fuselage 10. Furthermore, the crash unit 2200 comprises a crash box 2210 formed in the longitudinal direction of the crash unit 2200, an upper frame 2220 positioned between a front end of the crash box 2210 and the dash reinforcement assembly 2300, and a lower frame 2230 fastened to the upper frame 2220 and positioned at a lower end of the front end of the crash box 2210. A front end of the lower frame 2230 is configured to surround a lower end of a front surface of the crash box 2210, and the other end thereof is configured to be fastened with the upper frame 2220 and/or a front surface of the dash reinforcement assembly 2300. Therefore, an impact applied to the lower frame 2230 is configured to be transmitted along the upper frame 2220 and transmitted to the dash reinforcement assembly 2300 fastened to the upper frame 2220. In an example of the present disclosure, both ends of the lower frame 2230 in the width direction may be configured to be surface-bonded to the front surface of the dash reinforcement assembly 2300, and a center portion of the lower frame 2230 may be positioned to be fastened to the upper frame 2220.

That is, as illustrated in FIG. 8C, the lower frame 2230 is configured to be positioned on a lower end of the crash unit 2200 and configured to be positioned between the lower end of the crash box 2210 and the dash reinforcement assembly 2300, the upper frame 2220 is configured to surround an upper end of the crash unit 2200 and surround the front surface of the dash reinforcement assembly 2300 at the same time.

The upper frame 2220 may be configured to surround the upper end of the crash box 2210 and positioned to surround an outer circumference of the front surface of the dash reinforcement assembly 2300. That is, as illustrated, the upper frame 2220 is positioned to form a "¬"-shaped cross section.

The crash box 2210 is fastened to the front ends of the upper frame 2220 and the lower frame 2230 and positioned to be surface-bonded to the dash reinforcement assembly 2300. The crash box 2210 may be configured in the form of an open upper surface and configured to have a "U" shape with an empty inside. Furthermore, since a support surface 2212 is provided on one end of the crash box 2210 in which the crash box 2210 and the dash reinforcement assembly 2300 face each other, the dash reinforcement assembly 2300 and the support surface 2212 are configured to be surface-bonded. The support surface 2212 is configured to be bent downward in the height direction and surface-bonded to a front surface of an outer reinforcement 2310 of the dash reinforcement assembly 2300, and thus configured so that the impact applied via the crash box 2210 is transmitted to the outer reinforcement 2310.

As illustrated in FIG. 8D, the support surface 2212 is configured in the form of extending to the lower end of the crash box 2210 in the cross-sectional height direction. Therefore, the impact applied to the crash box 2210 is configured to be transmitted to the dash reinforcement assembly 2300 via the support surface 2212.

Furthermore, as illustrated in FIG. 8D, which illustrates a cross section along line A-A in FIG. 8B, the crash box 2210 includes at least one bent portion 2211 as a recessed region in the longitudinal direction. The bent portion 2211 is positioned to be bent in the height direction of the fuselage 10 and configured in a shape in which a lower surface is recessed to correspond to the bent portion. Furthermore, the bent portion 2211 is configured in a shape in which stress is concentrated if an impact is applied to the front of the fuselage 10. Therefore, if an impact is applied to the front end of the crash box 2210, the crash box 2210 is folded with respect to the bent portion 2211 and configured to absorb a part of the impact applied to the front end. The bent portion 2211 according to the present disclosure may be formed along the front surface of the crash box 2210 having a U-shaped cross section. Therefore, if a frontal impact is applied, at least one bent portion 2211 positioned on the crash box 2210 is folded and configured to absorb a part of the applied impact. Furthermore, an impact not absorbed is configured to be transmitted to the dash reinforcement assembly 2300 along the upper frame 2220, the lower frame 2230, and the support surface 2212. Therefore, the crash box 2210 of the crash unit 2200 is configured to perform a function of absorbing a part of the impact applied to the front end and at the same time, transmit the remaining impact to the entire fuselage 10.

In addition, the crash box 2210 according to the present disclosure includes an inclined portion positioned at a front of the lower end thereof at an angle facing the ground. The inclined portion may comprise a first inclined portion 2231 configured to have a first set angle with respect to the longitudinal direction of the fuselage 10 and a second inclined portion 2232 configured to have a second set angle greater than the first set angle with respect to the first inclined portion 2231. The first inclined portion 2231 and the second inclined portion 2232 may vary depending on an angle at which the first inclined portion 2231 and the second inclined portion 2232 collide with the ground due to the structure of the fuselage 10. Furthermore, since the lower frame 2230 is configured to surround a front surface of the first inclined portion 2231, the first inclined portion 2231 has a structure in which the impact applied to the inclined portion in contact with the ground is transmitted to the upper frame 2220 and the dash reinforcement assembly along the lower frame 2230.

One or more inclined portions according to the present disclosure may be configured, and inclined angles may be set differently depending on a degree of protrusion of the crash unit 2200 and an angle at which the window frame 110 is formed.

Figure 9:
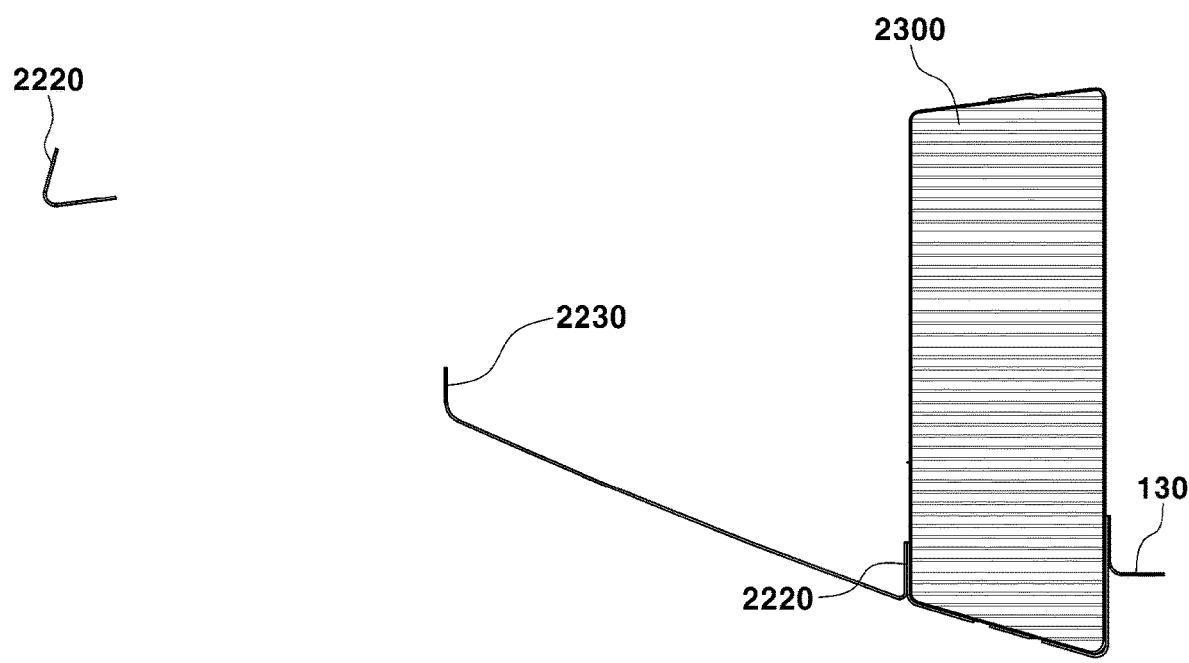
FIG. 9 is a cross-sectional view along line C-C in which a lower frame of the crash unit and a dash reinforcement assembly are fastened according to an example of the present disclosure.

FIG. 9 is a cross-sectional view along line C-C in FIG. 8B and illustrates a cross section in which the lower frame 2230 of the crash unit 2200 and the dash reinforcement assembly 2300 are fastened according to an example of the present disclosure.

The end of the lower frame 2230 is configured to be surface-bonded to the dash reinforcement assembly 2300, and the front end thereof is configured to surround the front end of the crash box 2210. Furthermore, an inner one end of the lower frame 2230 is configured to be in contact with an outer surface of the dash reinforcement assembly 2300 to extend from the outer surface of the dash reinforcement assembly 2300. That is, the lower frame 2230 is positioned to be fastened in the form of extending from an outermost surface of the dash reinforcement assembly 2300. Therefore, the lower frame 2230 may be configured to have a smooth extension surface between the crash unit 2200 and the fuselage 10. Furthermore, the lower frame 2230 and the outermost surface of the dash reinforcement assembly 2300 may be uniformly formed so that the impact applied to the front end of the crash unit 2200 is configured to be easily transmitted to the window frame 110 and the floor frame 130.

Figure 10:
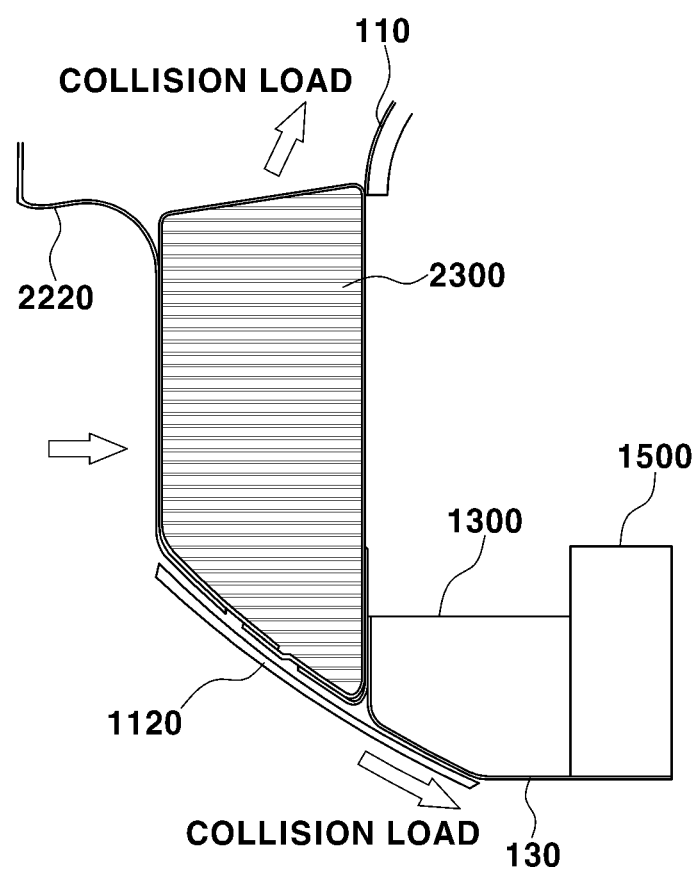
FIG. 10 is a cross-sectional view along line B-B in which an upper frame of the crash unit and the dash reinforcement assembly are fastened according to an example of the present disclosure.

FIG. 10 is a cross-sectional view along line B-B in FIG. 8B and illustrates a cross section of one end to which the crash unit 2200, the dash reinforcement assembly 2300, and a skid part 2120 according to the present disclosure are fastened.

The crash unit 2200 includes the upper frame 2220 configured to surround an outer portion of a front surface of the outer reinforcement 2310 of the dash reinforcement assembly 2300 and the skid part 2120 configured to surround at least some of an outer surface of the upper frame 2220 and a side surface of the dash reinforcement assembly 2300. The skid part 2120 is configured to surround both the side surface of the dash reinforcement assembly 2300 and the floor frame 130. Therefore, the impact applied from the upper frame 2220 is configured to be transmitted to the floor frame 130 along the dash reinforcement assembly 2300.

Since the dash reinforcement assembly 2300 includes an outer reinforcement 2310 positioned at the outermost side facing the crash unit 2200 of the dash reinforcement assembly 2300 and an inner reinforcement 2320 facing an interior in which occupants are positioned, parts of outermost surfaces of the outer reinforcement 2310 and the inner reinforcement 2320 are configured to be surrounded by the skid part 2120. Therefore, the skid part 2120 may be configured so that the impact applied from the crash unit 2200 may be moved along the floor frame 130, the window frame 110, and the skin part 150' of the window frame 110.

As described above, since the skid part 2120 is configured to simultaneously surround at least some of the skin of the fuselage 10, the window frame 110, the dash reinforcement assembly 2300, the floor frame 130, and the crash unit 2200, the impact applied to the front crash unit 2200 may be configured to be transmitted to adjacent components.

Figure 11:
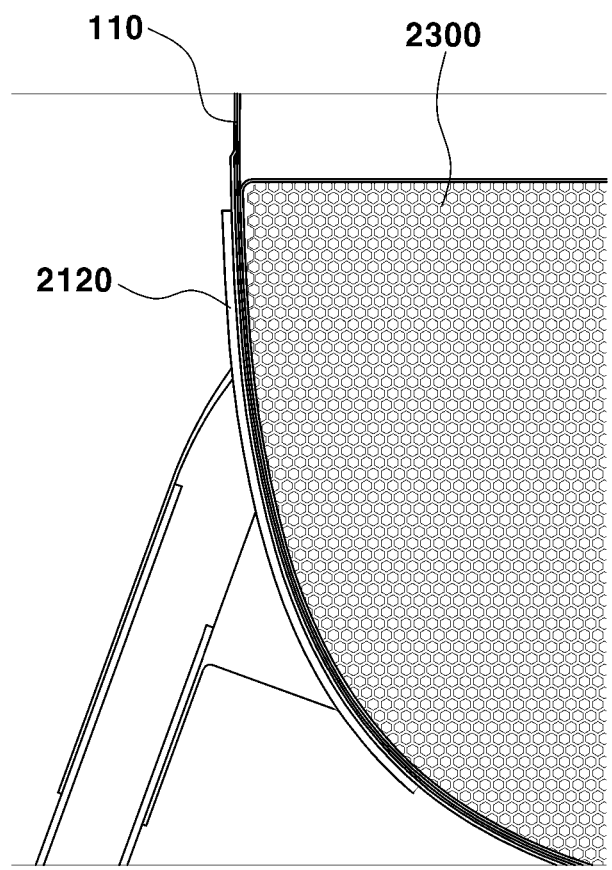
FIG. 11 is a cross-sectional view along a half of the line D-D in which the dash reinforcement assembly and a skid part are fastened according to an example of the present disclosure.

That is, as illustrated in FIG. 11, which illustrates a half of the cross section along line D-D in FIG. 8B (e.g., from one end to the midpoint of the line D-D in FIG. 8B), the impact applied to the skid part 2120 in the height direction along the skin part 150" of the lower surface of the fuselage 10 and the window frame 110 in cross section is configured to move upward, and the impact is configured to be transmitted to the floor frame 130 downward. The full cross-section along line D-D in FIG. 8B may be symmetrical.

The dash reinforcement assembly 2300 may be configured so that the impact applied from the crash unit 2200 is transmitted to adjacent components positioned adjacent to the dash reinforcement assembly 2300 along the outer reinforcement 2310 and an impact absorber 2330. Furthermore, the frontal impact is configured to be transmitted to the window frame 110 and the floor frame 130 in the height direction in a region adjacent to the skid part 2120.

Figure 12:
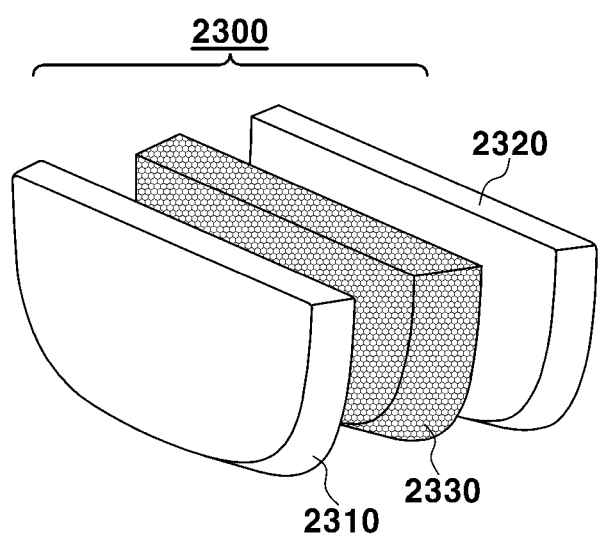
FIG. 12 is a configuration diagram of the dash reinforcement assembly according to an example of the present disclosure.

FIG. 12 is a view illustrating a lower level configuration of the dash reinforcement assembly 2300 according to an example of the present disclosure.

The dash reinforcement assembly 2300 according to the present disclosure may be configured to partition a space between the interior of the vehicle and the crash unit 2200 positioned ahead and positioned to be fastened to a front frame on which a windshield is positioned. The dash reinforcement assembly 2300 includes the outer reinforcement 2310 fastened to the crash unit 2200 positioned ahead and the inner reinforcement 2320 configured to face the interior of the fuselage 10 on which occupants are positioned, and includes the impact absorber 2330 positioned between the outer reinforcement 2310 and the inner reinforcement 2320. The impact absorber 2330 may be formed in a porous honeycomb structure to serve to absorb the impact transmitted to the outer reinforcement 2310.

Furthermore, even if the impact is transmitted to the front crash unit 2200, the inner reinforcement 2320 is configured to have high rigidity so as not to transmit the collision load to the interior of the fuselage 10 to serve to support the dash reinforcement assembly 2300 not to enter the interior of the vehicle in the event of the collision.

Furthermore, the inner reinforcement 2320 is fastened to the window frame 110 and the floor frame 130 and configured so that the impact applied to the dash reinforcement assembly 2300 is transmitted along the window frame 110 in the height direction and transmitted along the floor frame 130 in the longitudinal direction.

Figure 13A:
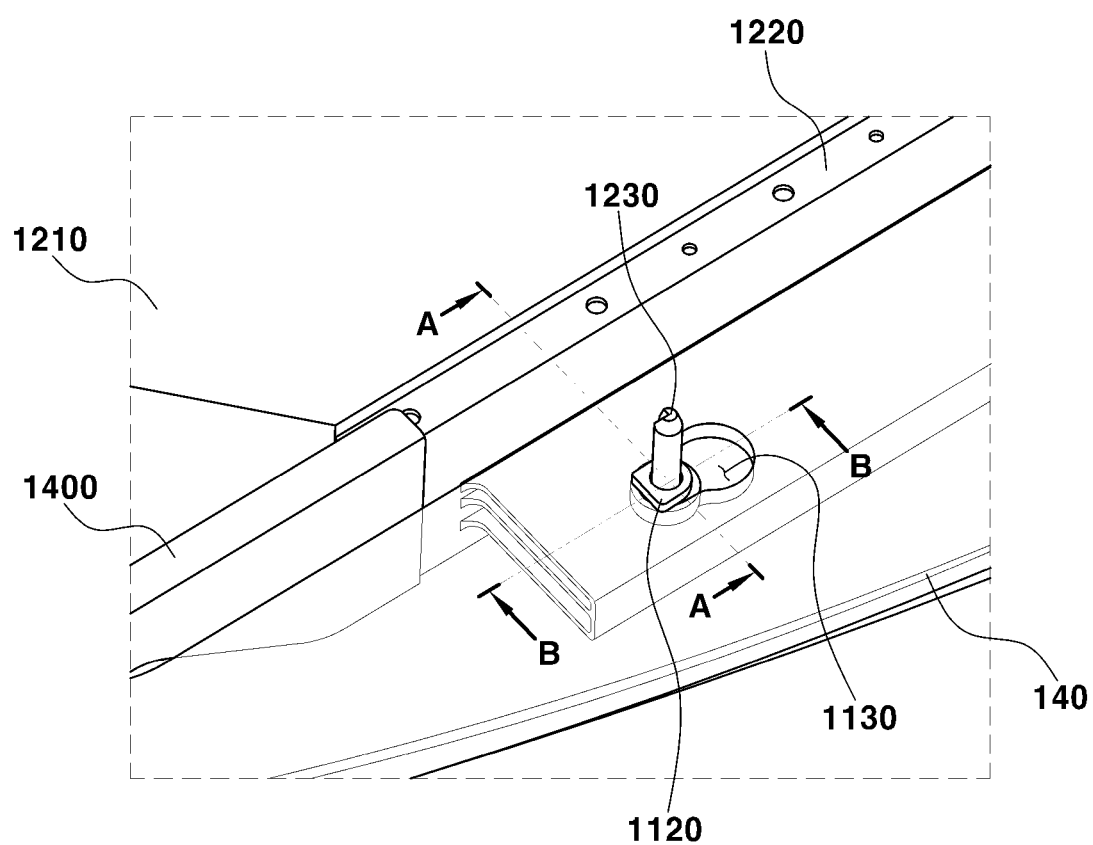
FIG. 13A is a view illustrating a state in which a fastening part is fastened to an accommodation part in a state in which there is no collision of the detachable battery structure of the fuselage according to an example of the present disclosure.
Figure 13B:
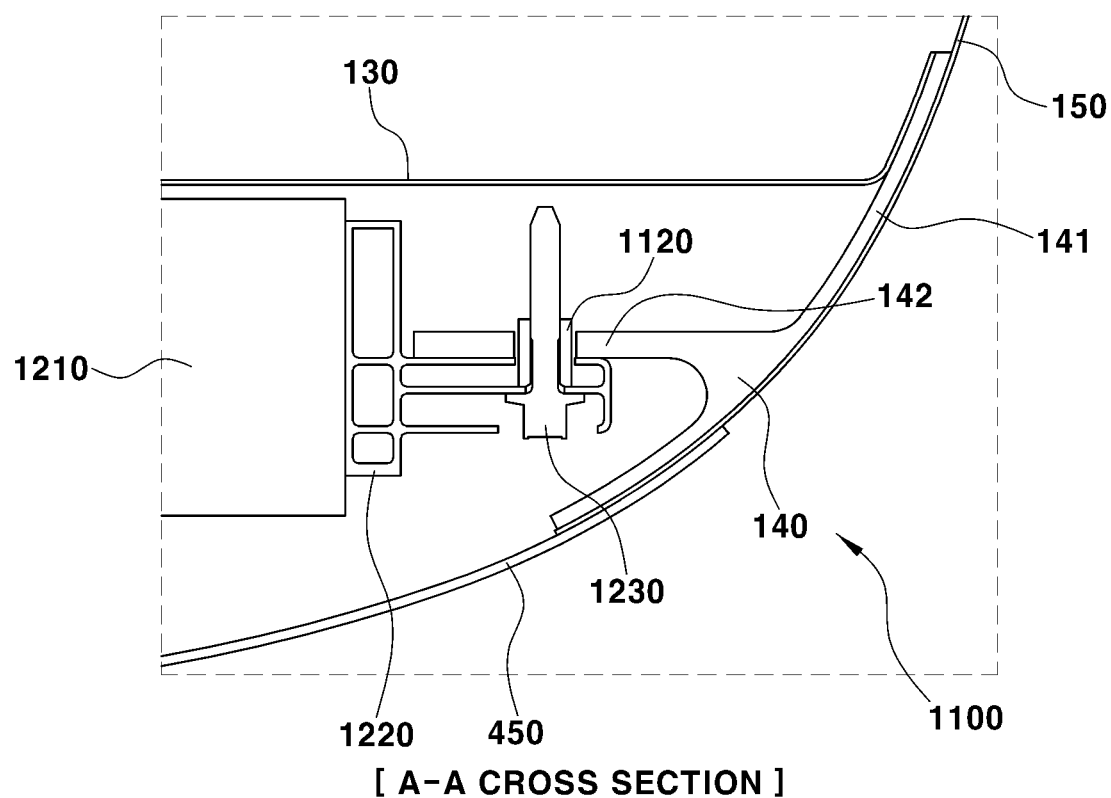
FIG. 13B is a cross-sectional view along A-A in FIG. 13A according to an example of the present disclosure.

FIG. 13A illustrates a state in which the fastening part 1230 is fastened to the accommodation part in a state in which there is no collision of the detachable battery structure of the fuselage according to an example of the present disclosure, FIG. 13B is a cross-sectional view along line A-A in FIG. 13A according to an example of the present disclosure, and FIG. 13C is a cross-sectional view along line B-B in FIG. 13A according to an example of the present disclosure.

Referring to FIGS. 13A to 13C, the floor unit 1100 may include a floor connector 140, an accommodation part 1120 and an expansion hole 1130. The floor connector 140 may be positioned on a side surface of the battery frame 1220 and formed to extend along the side surface of the battery frame 1220 in the longitudinal direction. The floor connector 140 may comprise a skin flange 141 fixed to the skin part 150 of the fuselage (e.g., fixed to a portion of the skin part 150 corresponding to a side of the fuselage and a portion of the skin part 150 corresponding to a lower part of the fuselage). The floor connector 140 may comprise a floor horizontal flange 142 protruding outward from the skin flange (e.g., extending towards the battery frame 1220 from the skin part 150).

The accommodation part 1120 may be fixedly formed on the floor connector 140 so that the fastening part 1230 passes therethrough. As illustrated in FIG. 13A, the accommodation part 1120 may be fixed to a member horizontally formed inside the fuselage of the floor connector 140. In an example, the accommodation part 1120 may be fixed to the floor connector 140 by projection welding. The accommodation part 1120 may be a nut into which the fastening part 1230 may be inserted and fixed.

The expansion hole 1130 may be formed in the floor connector 140 at a rear end of the accommodation part 1120 in the longitudinal direction of the accommodation part 1120. The expansion hole 1130 may be wider than the cross section of the accommodation part 1120. The expansion hole 1130 may extend to the rear side of the floor connector 140 to which the accommodation part 1120 is fixed and thus may be formed in a size at which the accommodation part 1120 may be completely detached rearward. The size of the expansion hole 1130 may be larger than an outer diameter of the accommodation part 1120 and configured so that the accommodation part 1120 and the battery unit 1200 are integrally detached from the floor connector 140 in the event of the frontal collision of the fuselage. If the dash reinforcement assembly 2300 moves to a position adjacent to the cross member 1500 in the longitudinal direction, the battery frame 1220 performs the longitudinal movement integrally with the battery unit extension 1400. Therefore, the fastening part 1230 moves to a region in which the expansion hole 1130 is positioned.

The accommodation part 1120 may be configured to be detached from the floor connector 140 by the pressure of the fastening part 1230 in the event of the frontal collision of the fuselage. If the collision is applied, the accommodation part 1120 may be configured to perform the longitudinal movement in an opposite direction to which the collision is applied to be detached from the floor connector 140 and move to the expansion hole 1130 integrally with the battery unit 1200. In an example, as illustrated in FIG. 13C, the fastening part 1230 may receive the load intensively at a portion in contact with the cross section of the battery frame 1220, and the accommodation part 1120 coupled with the fastening part 1230 may be detached from the floor connector 140 by the pressure of the fastening part 1230.

The accommodation part 1120 coupled to the fastening part 1230 may be detached from the floor connector 140 to move to the expansion hole 1130 integrally with the battery unit 1200. In an example, the accommodation part 1120 may be configured to move to the expansion hole 1130 integrally with the battery unit 1200 in response to a change in the interval between the battery unit extension 1400 and the cross member 1500 in the event of the frontal collision of the fuselage. According to an example of the present disclosure, the load absorbed by the battery unit extension 1400 via the window frame 110 in the event of the frontal collision of the fuselage may be transmitted to the battery frame 1220, and the accommodation part 1120 coupled to the fastening part 1230 may be detached from the floor connector 140 so that the battery 1210 may be detached from the fuselage.

The deformation of the space between the dash reinforcement assembly 2300 and the cross member 1500 may be the longitudinal movement distance of the battery unit extension 1400 and the distance at which the accommodation part 1120 is detached from the floor connector 140 to move to the expansion hole 1130. If the battery unit extension 1400 moves backward, the battery frame 1220 moves backward, and the accommodation part 1120 may be detached from the floor connector 140. In an example, a size of the expansion hole 1130 may be greater than a minimum movement distance value of a central point of the accommodation part 1120 for the accommodation part 1120 to be detached from the floor connector 140.

The present disclosure provides the detachable battery structure of the fuselage capable of securing fire stability by detaching the battery 1210 from the fuselage in the event of the frontal collision due to the crash of the fuselage.

The present disclosure has been made in efforts to solve the problems and is directed to providing a detachable battery structure of a fuselage configured so that a battery unit receives a collision load via a battery unit extension connected to a window frame and the battery unit of the fuselage to be detached from the fuselage.

In addition, the present disclosure is directed to providing a detachable battery structure of a fuselage configured so that a front reinforcement member may be formed in a space between a window frame and a cross member to improve a front-rear rigidity of the fuselage and damaged after absorbing a load in the event of a collision to move a battery unit extension backward.

Objects of the present disclosure are not limited to the above-described objects, and other objects that are not mentioned can be understood by the following description and more clearly known by examples of the present disclosure. In addition, the objects of the present disclosure may be achieved by means described in the claims and combinations thereof.

In order to achieve the objects, a detachable battery structure of a fuselage includes the following configuration.

In an example of the present disclosure, a detachable battery structure of a fuselage includes a floor unit fixed to a skin part of a fuselage, a battery unit fastened to the floor unit and configured to receive a load in the event of a frontal collision of the fuselage, and a battery unit extension fastened to a window frame of the fuselage and configured to transmit the load to the battery unit in the event of the frontal collision of the fuselage, wherein the window frame moves backward in the event of the frontal collision of the fuselage so that the battery unit extension moves in a longitudinal direction, and the battery unit is configured to move backward to be detached from the floor unit.

In addition, the battery unit may include a battery positioned under a floor panel of the fuselage, a battery frame formed to extend from a side surface of the battery in the longitudinal direction, and a fastening part formed on the battery frame and configured to fix the battery unit to the floor unit.

In addition, the floor unit may include a floor positioned on a side surface of the battery frame and formed to extend in the longitudinal direction, an accommodation part fixedly formed on the floor so that the fastening part passes therethrough, and an expansion hole formed in the floor at a rear end of the accommodation part in the longitudinal direction to be wider than a cross section of the accommodation part.

In addition, the accommodation part may be configured to be detached from the floor by the pressure of the fastening part in the event of the frontal collision of the fuselage and move to the expansion hole integrally with the battery unit.

In addition, the load absorbed to the battery unit extension via the window frame in the event of the frontal collision of the fuselage may be configured to be transmitted to the battery frame.

In addition, the expansion hole may have a size greater than an outer diameter of the accommodation part and configured so that the accommodation part and the battery unit are integrally detached from the floor in the event of the frontal collision of the fuselage.

In another example of the present disclosure, a detachable battery structure of a fuselage includes a floor unit fixed to a skin part of a fuselage, a battery unit fastened to the floor unit and configured to receive a load in the event of a frontal collision of the fuselage, and a battery unit extension fastened to a window frame of the fuselage and configured to transmit the load to the battery unit in the event of the frontal collision of the fuselage, wherein the battery unit extension is configured to move backward in response to the deformation of a space between the window frame and the cross member in the event of the frontal collision of the fuselage, and the battery unit is configured to be detached from the floor unit.

In addition, the battery unit may include a battery positioned under a floor panel of the fuselage, a battery frame formed to extend from a side surface of the battery in the longitudinal direction, and a fastening part formed on the battery frame and configured to fix the battery unit to the floor unit.

In addition, the floor unit may include a floor positioned on a side surface of the battery frame and formed to extend in the longitudinal direction, an accommodation part fixedly formed on the floor so that the fastening part passes therethrough, and an expansion hole formed in the floor at a rear end of the accommodation part in the longitudinal direction to be wider than a cross section of the accommodation part.

In addition, the accommodation part may be configured to move to the expansion hole integrally with the battery unit in response to a movement of the battery unit extension in the event of the frontal collision of the fuselage.

In addition, the detachable battery structure of the fuselage may further include a front reinforcement member positioned between the window frame and the cross member, wherein the front reinforcement member is configured to absorb a load in the event of the collision of the fuselage.

The present disclosure can obtain the following effects by the above-described examples and a configuration, coupling, and use relationship, which will be described below.

The battery unit can be configured to receive the collision load via the battery unit extension connected to the window frame and the battery unit of the fuselage to be detached from the fuselage, thereby securing battery fire stability due to the collision.

The front reinforcement member can be configured to be formed in the space between the window frame and the cross member to improve the front-rear rigidity of the fuselage and damaged after absorbing the load in the event of the collision to move the battery unit extension backward, thereby securing stability without additional components for the battery.

The above detailed description is illustrative of the present disclosure. In addition, the above-described contents are intended to illustrate and describe preferred examples of the present disclosure, and the present disclosure can be used in various other combinations, modifications, and environments. That is, changes or modifications are possible without departing from the scope of the concept of the disclosure disclosed in the specification, the scope equivalent to the disclosed contents, and/or the scope of skill or knowledge in the art. The described examples describe the best mode for implementing the technical spirit of the present disclosure, and various changes required in specific application fields and uses of the present disclosure are also possible. Therefore, the above detailed description of the disclosure is not intended to limit the present disclosure to the disclosed examples. In addition, the appended claims should be construed to include other examples as well.

What is claimed is:

1. A detachable battery structure of a fuselage, comprising:
    a floor connector connected to an inner surface of the fuselage;
    a battery unit comprising a battery frame configured to accommodate a battery fastened to the floor connector and configured to receive a load in response to a frontal collision of the fuselage;
    a battery unit extension fastened to a window frame of the fuselage and configured to transmit the load from the window frame to the battery unit in response to the frontal collision of the fuselage;
    a crash unit, comprising a crash box, positioned in front of the window frame; and
    a dash reinforcement assembly fastened to the window frame and positioned on a rear surface of the crash unit, wherein the dash reinforcement assembly is configured to move rearward, in a longitudinal direction of the fuselage, in response to the frontal collision of the fuselage, wherein the longitudinal direction is parallel to a direction from a front of the fuselage to a rear of the fuselage, wherein the battery unit extension is configured to move rearward in the longitudinal direction in response to the dash reinforcement assembly moving rearward, and wherein the battery unit is configured to move rearward in the longitudinal direction, and wherein the battery unit is configured to be detached from the floor connector based on moving rearward in the longitudinal direction.

2. The detachable battery structure of the fuselage of claim 1, wherein the battery unit further comprises:
    the battery, accommodated by the battery frame under a floor panel of the fuselage, wherein the battery frame extends from a side surface of the battery and in the longitudinal direction; and
    a fastener formed on the battery frame and configured to fix the battery unit to the floor connector.

3. The detachable battery structure of the fuselage of claim 2, wherein the floor connector is positioned on a side surface of the battery frame and extends in the longitudinal direction;
    wherein an accommodation part fixed to the floor connector is configured to accommodate the fastener to pass therethrough; and
    wherein an expansion hole is formed in the floor connector at a rear end, in the longitudinal direction, of the accommodation part and is wider than a cross section of the accommodation part.

4. The detachable battery structure of the fuselage of claim 3, wherein the fastener is configured to be moved rearward, with the battery unit and in response to the rearward movement of the dash reinforcement assembly based on the frontal collision of the fuselage, to the expansion hole, and wherein the accommodation part is configured to detach from the floor connector based on the fastener moving rearward.

5. The detachable battery structure of the fuselage of claim 2, wherein the battery frame is configured to receive the load from the battery unit extension via the dash reinforcement assembly.

6. The detachable battery structure of the fuselage of claim 3, wherein the expansion hole has a size greater than an outer diameter of the accommodation part and wherein the accommodation part, with the battery unit, is configured to detach from the floor connector via the expansion hole based on the frontal collision of the fuselage.

7. A detachable battery structure of a fuselage, comprising:
    a floor connector connected to a skin of the fuselage;
    a battery unit, comprising a battery frame configured to accommodate a battery, fastened to the floor connector and configured to receive a load in response to a frontal collision of the fuselage;
    a battery unit extension fastened to a window frame of the fuselage and configured to transmit the load from the window frame to the battery unit in response to the frontal collision of the fuselage;
    a crash unit, comprising a crash box, positioned on a front end of the window frame;
    a dash reinforcement assembly fastened to the window frame and positioned on a rear surface of the crash unit; and
    a cross member positioned at a rear of the window frame and configured to allow the battery unit extension to pass therethrough, wherein the battery unit extension is configured to move rearward in a longitudinal direction of the fuselage in response to deformation of a space between the dash reinforcement assembly and the cross member in response to the frontal collision of the fuselage, wherein the longitudinal direction is parallel to a direction from a front of the fuselage to a rear of the fuselage, and wherein the battery unit is configured to be detached from the floor connector based on the rearward movement of the battery unit extension.

8. The detachable battery structure of the fuselage of claim 7, wherein the battery unit further comprises:
    the battery, accommodated by the battery frame, under a floor panel of the fuselage, wherein the battery frame extends from a side surface of the battery and in the longitudinal direction; and
    a fastener formed on the battery frame and configured to fix the battery unit to the floor connector.

9. The detachable battery structure of the fuselage of claim 8, wherein the floor connector is positioned on a side surface of the battery frame and extends in the longitudinal direction;
    wherein an accommodation part fixed to the floor connector is configured to accommodate the fastener to pass therethrough; and
    wherein an expansion hole is formed in the floor connector at a rear end, in the longitudinal direction, of the accommodation part and is wider than a cross section of the accommodation part.

10. The detachable battery structure of the fuselage of claim 9, wherein the accommodation part is configured to move, with the battery unit, to the expansion hole in response to a movement of the battery unit extension based on the frontal collision of the fuselage.

11. The detachable battery structure of the fuselage of claim 7, further comprising a front reinforcement member positioned between the window frame and the cross member,
    wherein the front reinforcement member is configured to absorb a load applied between the dash reinforcement assembly and the cross member based on the frontal collision of the fuselage.

12. The detachable battery structure of the fuselage of claim 7, wherein the crash box extends in the longitudinal direction of the fuselage, and wherein the crash unit further comprises:
    an upper frame positioned between a front end of the crash box and the dash reinforcement assembly; and
    a lower frame fastened to the upper frame and positioned on a lower end of the front end of the crash box.

13. The detachable battery structure of the fuselage of claim 12, wherein the crash box comprises:
    a first inclined portion having a first set angle with respect to the longitudinal direction of the fuselage; and
    a second inclined portion having a second set angle, greater than the first set angle, with respect to the first inclined portion.

14. The detachable battery structure of the fuselage of claim 7, wherein the dash reinforcement assembly further comprises:
    an outer reinforcement facing the crash unit;
    an inner reinforcement positioned facing an interior of the fuselage; and
    an impact absorber between the outer reinforcement and the inner reinforcement.

* * * * *